UNITED STATES PATENT OFFICE 2,077,418

DENTAL IMPRESSION PASTE

Ernest Byron Kelly, Chicago, Ill.

No Drawing. Application June 14, 1933,
Serial No. 675,712

8 Claims. (Cl. 18—47)

This invention relates to a dental impression paste and more particularly to the manufacture of a dental impression paste of an oil type that sets quickly under the conditions of use, but which has many very important advantages over the common plaster type of impression paste.

The present impression materials that are on the market today are water preparations, principally plaster of Paris and other various forms of plaster combinations. All of these products require the assistance of a large amount of water in order that they may become set or hard in taking impressions in the mouth.

It has been found very difficult to provide satisfactory oil mixes with any mineral compounds, which will set in the presence of water. The oil impression paste of my invention is founded upon the principle of mixing suitable oxides, resins and oils and incorporating into the body of the mix a mineral substance which sets the whole mix in the presence of moisture and of warmth equivalent to the body temperature of 98.6°.

The setting qualities of my oil impression paste depend upon several factors among which are water and heat. The presence of acid or alkaline media has a very pronounced effect upon the setting of the product. In a neutral solution, the paste will remain soft much longer than it would if it were in the presence of either an acid or an alkaline media.

In the use of plaster of Paris or any of its combinations, it is mixed with water and, when placed in contact with the tissue, the free water present unites with the water that exists in the mixed plaster. This leads to one of the outstanding difficulties in taking impressions with plaster of Paris, because plaster of Paris absorbs moisture very rapidly and, even after it is set, will continue to draw all of the free moisture or even the moisture that lies within the softened tissue for an unlimited time. It is, therefore, evident that plaster of Paris cannot be retained in the mouth for any period of time without grave injury to the surrounding tissue.

In contrast, the use of my oil impression paste, which is non-irritant, has no deleterious effect upon the tissue, and, aside from a slight stimulation when first placed in the mouth, is not only soothing but is comfortable to the patent.

Plaster of Paris, when setting, creates heat. My oil impression paste sets without generating appreciable heat and reaches the body temperature only because of its long presence in the mouth.

It is quite evident that any material that is either hot or that will create heat will cause an intense distortion or dilation of the peripheral vessels in the softened tissue, and that the impression registered will not be a representation of the tissue at rest. My oil impression paste is an oil preparation and sets without absorbing any appreciable quantity of water. For this reason it makes an accurate impression of the tissue without any of the distortions or changes which accompany the use of water absorbing preparations, or any product which is softened by heat as waxes, mounting compounds, etc.

The common materials used in taking impressions in the mouth or dentures are waxes, modeling compounds, and plasters as previously mentioned. All of these materials depend upon heat in excess of the body temperature of 98.6° F., and therefore are of questionable merit in the taking of accurate impressions. Plaster of Paris, modeling compounds, and gums, moreover, when placed in the mouth will not cling to the tissue, and waxes particularly will curl up and leave the tissue at points where it is most essential, for the successful making of dentures, that they remain firmly attached.

The oil impression paste of my invention will cling to the tissue whether it be the tongue in motion or any of the muscle attachments that line or are near the ridges in the mouth, and will remain in contact until the material becomes hard.

As contrasted with this, in the use of the ordinary modeling compounds and waxes, the operator is required to use a little digital force to make his impression material hug closely to the tissue, because he knows that unless it is pressed in it will not remain in contact throughout its hardening period. Thus it will be seen that there is danger that he will either over-compress the tissue, or, if left to itself, the wax or plaster will not be in contact—two very difficult problems in the taking of impressions.

My oil impression paste remains constant against the soft, moving tissue without compression or without leaving the tissue itself.

In plaster of Paris and other products requiring a water medium for setting, when an impression is taken, the impression cannot usually be returned to the mouth, and should one be able to return a plaster impression, it would be totally impossible to add more material to the hardened mix. In contrast, when my oil impression paste is used, more material may be added at any time until satisfaction is obtained and the adaption to the tissue is correct.

Plaster of Paris cannot remain in the mouth for more than a very few minutes. Oil impression paste may be retained in the mouth for weeks, or even months, without injury; and because of its healing qualities, stimulates the tissue to a healthy, normal condition.

One of the most important features in the use of my oil impression paste is not only its corrective properties, but its application where teeth have been recently extracted. In such cases, the paste is permitted to enter into the sockets immediately and can be retained for two or three days without the slightest injury to the previously abused tissue. In fact, when a case returns in which the oil impression paste has been placed into a denture to act as immediate service or as a temporary convenience to the patient, the inflammation common in most extraction cases is not present.

As to the healing properties of my oil impression paste, it may be said that the material has a very decided sedative action. It is an anodyne, it has a slight astringent effect, and its antiseptic qualities are derived from the eugenol and zinc oxide which go to make up the major portion of the product. However, it is believed that a mixture of oil impression paste depends a great deal upon its healing qualities, not from the material itself but from the manner in which it acts upon the tissue.

Being an oil preparation, and having the qualities of closely uniting the particles of the powder, it makes a seal which prevents the pathogenic bacteria from getting into the areas which are desired to be protected. It forms a tight seal surrounding and protecting the injured parts; and in the case of a pyorrhea pocket, or of an abscess at the end of a root of a tooth which has been extracted, where a denture has immediately been placed in position, this paste permits bodies antagonistic to pathogenic organisms to become active.

My product has flowing qualities which enable it to go into all crevices and pockets of the mouth, thereby producing extremely detailed and accurate impressions.

My paste may also be used as a plaster wash. A wax or other suitable material is first used to obtain what is known as a snap impression. The wax impression may then be coated with my paste and replaced in the mouth for several minutes until the paste has set. This results in a thin coating of paste over the wax, the paste carrying a very perfect impression of the mouth. For this purpose, my paste is decidedly superior to plaster of Paris which changes its form on drying out and is therefore entirely unsuitable for this purpose.

My oil impression paste can be used in the same manner and will remain indefinitely upon these preconstructed impression products to give the finest details.

Plaster of Paris, as used in taking impressions, must have a coating laid over the impression before making a cast, namely, a duplication of the mouth in plaster. A separating medium must be used before this cast can be made.

My oil impression paste requires no separating media, but the plaster may be poured into the impression and the resulting cast will give every detail of the mouth without any shellacs or gums as separating media. In the separating of the oil impression paste from the plaster cast, all that is required is simply a heating of the product in hot water at a temperature around 150° F., and it is very readily removed. This is impossible in the use of plaster of Paris, which requires a cutting away of the plaster to remove it from its original cast.

For tolerancy tests of dentures which have been previously made, the old system was to reline for temporary service with waxes or modeling compounds. These two products have a rigidity which would distort tissue unless they were heated to a very high temperature and reduced to a thin lining on the inside of a previously made denture.

The use of my oil impression paste has changed entirely this system of temporary reline for tolerancy tests in the mouth. By tolerancy tests is meant a method by which the dentist is able to determine whether the patient can wear the appliance with comfort and satisfaction without it becoming dislodged or being removed in the course of speaking or eating. By leaving the case in the mouth a few days with the material in, the dentist is able to tell with reasonable certainty what the ultimate result will be.

Keeping in mind that relinings made of gums, waxes, and modeling compounds distort the tissue to a certain extent, it is quite evident that any product which will leave the tissue in its natural condition would be a very acceptable commodity, and that is exactly what my oil impression paste will do. When placed on the inside of a previously constructed denture, it flows with the thinness of tissue paper, and any space that may exist between the tissue and the denture is closed up, so that perfect adaptation is obtained.

By wearing the denture with the oil impression paste placed within it, the patient is able to determine whether the case is going to be satisfactory or not. When the patient becomes satisfied with the temporary relining of oil impression paste, it is not a difficult problem to replace this temporary lining with the material of which the plate had been previously constructed and naturally the results will be equivalent to the tolerancy tests made.

A great many difficulties arise in the adaption of dentures which have been constructed upon articulators. By articulators is meant mechanical devices so constructed as to represent in a sense the movements of the human jaw. Casts are placed upon this instrument, of both the upper and the lower mouth, to produce a representation of the mouth. Teeth are set upon wax and articulated, that is, the relationship of the artificial teeth to each other is established, so that when placed back into the mouth, there is reproduced a reasonable representation of what the natural teeth were at one time.

It can be understood that mechanical devices of this kind only afford approximate relationship between the two jaws, because the mouth is constructed with soft tissue and the mix pressure will give an entirely different registration than that which might be obtained upon a plaster cast. The "cast" is looked upon as a duplicate of the model, and by model we refer to the mouth itself, the cast being a representation usually in plaster of the mouth. Therefore, if the cast is constructed of plaster, it has not the elastic qualities that exist in the tissue.

Now, when teeth have been set upon the wax and placed in the mouth, the slight giving of the tissue will permit even an ill-fitting trial case to register correctly, but should an absolutely accurate relationship between the tissue and the teeth that have been placed upon the wax be desired, the best method is to place my oil impression paste on the inside of the waxes of the trial case and thereby obtain the tissue in its normal relationship without any changes.

My oil impression paste is preferably provided in two parts, and these parts are combined at the time of using the preparation. One of these parts is a powder containing the solid ingredients of my product, and the other part is a liquid mixture of oils and resins and provides the paste-like consistency of the product that is necessary to its use as an impression paste and for other purposes. The powder and the oil are mixed like a cement into a paste of putty-like consistency. This paste will remain soft if left on the mixing slab exposed to the air for upwards of an hour or more, but when applied in the mouth will set within five minutes.

One of the advantages of my product is that there is no heating of the product in softening and no heat generated during the process of hardening or setting. Another advantage is that after the material has hardened in the mouth, the impression may be allowed to remain as long as desired, or removed and more paste added until there is a satisfactory adaption.

When used as an impression paste, the paste sets in the mouth in contact with the tissues of the mouth or with the walls of the oral cavity or pocket and maintains this close contact during its entire setting time, with the result that an accurate impression is obtained.

It is therefore an object of this invention to provide a composition in the nature of an oil paste which is capable of being readily molded and of taking delicate impressions, and which in the presence of moisture sets like a cement and sets to a relatively hard, coherent mass without destruction of the impressions molded therein.

It is a further important object of this invention to provide a dental impression paste that will not set within an unduly short period when exposed to the air, but which will set rapidly under the conditions of use without generation of heat.

It is a further important object of this invention to provide an oil impression paste that can be allowed to remain indefinitely in the mouth without any irritation to the tissues.

It is a further object of this invention to provide an oil impression material which can be used as a temporary lining in a denture and when the cast is made, a separation may be accomplished with hot water without the aid of separating media.

Other and further important objects of this invention will become apparent from the following description and appended claims.

The solid and liquid portions of my preparation are prepared separately and then mixed at the time of use. The solid portion is in the form of a finely powdered mixture and preferably comprises finely divided zinc oxide, gum rosin and an active hardening agent. The hardening agent that I have found most suitable is fused and finely powdered magnesium chloride.

Zinc oxide is a non-irritant and a mild antiseptic. While it has a tendency to absorb water, it can lie in close contact with the tissues of the mouth or the skin of the face without injury to these parts, and with, in fact, a soothing action thereon. Although other substances can be substituted in part for the zinc oxide, such as tin oxide, aluminum oxide, or other metallic oxides, I prefer to use a large proportion of zinc oxide in my product because of its very satisfactory properties. In general, such relatively inert and water insoluble substances as magnesite, magnesium oxide, magnesium carbonate and other magnesium and calcium compounds, bismuth subnitrate and the like may be used to replace some of the zinc oxide in my preparation.

Gum rosin is also a preferred ingredient of the solid portion of my preparation. Gum rosin gives body to the preparation and enhances the binding qualities of it by holding the oxides or other mineral substances in a coherent mass after setting. Also, the rosin imparts valuable thermo-plastic properties to the hardened paste and permits its removal when used as a lining for denture or cast by the use of hot water.

Magnesium chloride is the preferred active hardening agent used in my preparation to give the paste setting properties.

In place of magnesium chloride, magnesium sulphate and other magnesium salts may be used, but with less satisfactory results. Substances such as zinc chloride, while operative to some extent as hardeners in my preparation, are to be avoided on account of their poisonous properties.

The proportions of the ingredients of my composition may be varied through a wide range, but the most satisfactory ranges for the solid ingredients are as follows:

| | Percent by weight |
|---|---|
| Zinc oxide | 50 to 95 |
| Rosin | 5 to 50 |
| Hardener (MgCl$_2$) | 0.1 to 10 |

These percents are based upon the total ingredients included in the solid or powder portion of the composition.

When high percentages of hardener are used, I prefer to add a small quantity of an agent such as magnesium oxide to retard the setting time. However, the use of magnesium oxide in my product is not necessary, and I prefer to lower the quantity of hardener sufficiently to avoid the necessity of using it.

The preferred formula of the solid portion is as follows:

| | Percent |
|---|---|
| Zinc oxide | 80 |
| Rosin | 19 |
| Magnesium chloride | 1 |

In making up the solid formula, the magnesium chloride is preferably mixed with 4 parts of zinc oxide before addition to the balance of the ingredients. Likewise the rosin is finely ground and preferably mixed with an equal part of zinc oxide. I prefer to employ a finely ground air floated rosin although the air flotation is not absolutely essential. Both the rosin and zinc oxide should be in the form of very finely divided powder if the best results are to be obtained, preferably of such fineness as to pass through a 100 mesh screen. The balance of the zinc oxide is then added to the mixture of magnesium chloride and zinc oxide and the rosin and zinc oxide mixture is mixed in thoroughly to obtain a uniform distribution of the magnesium chloride throughout the powdered material. The mixing must be very carefully performed to obtain the necessary uniformity of distribution of the magnesium chloride in view of its relatively small percentage of the whole. The mixing must be particularly well done, if the ingredients are all mixed in a single step.

I prefer to do all of the operations of preparing and mixing my product at as low a humidity and temperature as possible and also to have the containers cold and dry. I also prefer to have the containers in which the prepared product is stored be air and water tight.

The type of magnesium chloride used in my preparation has a decided effect upon its setting time, both in the mouth and when exposed to air. I prefer to use a magnesium chloride which has been heated sufficiently to remove substantially all of the water of crystallization.

The use of such magnesium chloride will provide a preparation which will not harden when mixed with oil and exposed to the air for an hour or more, as explained above. The fused and crystalline grades of magnesium chloride will also work, but the product will then set much more quickly, especially under conditions of high humidity.

I have found the 1% of magnesium chloride given in the above formula to be best for general purposes. The effect of increasing the hardener is to decrease the setting time of the product and vice versa, so that when it is desired to change the setting time of the paste, it is only necessary to adjust the proportion of hardener properly.

The oil portion of my preparation has preferably, as one of its chief ingredients, oil of cloves, or eugenol. I prefer to employ at least 20% by weight, based on the total weight of the liquid portion of my composition. Oil of cloves is a very powerful antiseptic. Preferably eugenol is used, since it is not so irritating in its effect as less refined grades of oil of cloves. Oil of cloves is a desensitizing agent, an enodyne, an antiseptic, and a disinfectant.

While numerous oils may be incorporated into my product, I have found that best results are obtained when the oily portion contains oil of cloves in proportions ranging from 20 to 90% of the total oil. The following substances may be used in the oily portion of my composition: wintergreen, eucalyptus, nutmeg, sassafras, peppermint, almond, oil of sweet birch, pine oil, cinnamon, citronella, and other essential oils.

Allspice oil may be used to entirely replace the oil of cloves in my formula if desired.

In order to produce a milder tasting preparation, and also to produce a certain degree of oiliness and plasticity in the preparation, it is preferred to use a suitable vegetable or mineral oil in conjunction with the oil of cloves. Olive oil has been found very satisfactory, but peanut oil, light mineral oil, rape oil, cottonseed oil, sesame oil, soya bean oil, and maize oil, and others, may likewise be used.

In its preferred form, the oily portion of my preparation also includes a drying or semi-drying oil, such as turpentine or linseed oil. Raw linseed oil has proved most satisfactory, but boiled or oxidized linseed oil may be used also. The linseed oil imparts drying properties to my oil impression paste of a character similar to the drying properties of a paint, and also aids as a binding agent to give greater flexibility and cohesion similar to a linoleum to the paste after it has set. In place of linseed oil, soya bean, safflower, poppyseed and China-wood oil, or similar oils, may be used.

In addition to these oils, I also prefer to dissolve rosin in the oily portion of my preparation. Rosin is soluble in the oils mentioned and in the proportions in which it is used, as will appear from the formula hereinafter given of the oily portion. It is obvious that the total quantity of the rosin used in my preparation may be contained wholly within the solid portion or within the oil portion, but I obtain best results by placing some of the rosin in the oil portion. In place of rosin, other gums and resins having similar properties, such as carnauba wax, kauri gum, or coumar resin may be used.

However, I have found that the rosin is superior to the various substitutes therefor mentioned above, and that gum rosin is particularly suitable for use in both the oil and solid portions of my composition. The chief advantage of gum rosin over other rosins is that it provides a mixture which sets very slowly when exposed to air after the oil has been added, without materially increasing the time required for the product to set in the mouth.

I find that by incorporating a gum such as rosin into the oil portion of my composition it tends to retard the setting time. This is probably due to the fact that the rosin thickens the oil and the thickened oil has a greater tendency to cling around the particles of hardener and prevent a prompt reaction with the other ingredients of my composition.

The preferred formula of the oil portion is as follows:

| | Parts by weight |
|---|---|
| Oil of cloves or eugenol | 100 |
| Gum rosin | 30 |
| Olive oil | 30 |
| Linseed oil | 10 |
| Light mineral oil | 10 |

The mineral oil used may be Russian white mineral oil or other equivalent oil.

The above proportions are not critical, but can be varied through a wide range. As previously stated, both the olive oil and linseed oil may be omitted or some other non-drying, drying or semi-drying oil substituted. Likewise, the gum rosin may be omitted from the oil formula and correspondingly increased in the solid formula. However, I find that a superior product is produced if part of the rosin is dissolved in the oil.

When the preparation of my invention is to be used, a definite quantity of the solid formula is measured out, as, for instance, a half-teaspoonful (approximately 1 gram), and placed on a glass slab or the like, and then a definite quantity of the oil formula, such as 10 drops (approximately .3 gram), is measured out onto the slab and the oil and powder thoroughly mixed to form a paste. No water is added, nor should any moisture or water be present on the slab during the mixing process. After the paste has been prepared, it may be allowed to stand for upwards of an hour or longer without setting. In case the humidity is very high, the setting occurs more rapidly. The setting may be retarded somewhat under these conditions by using a heated mixing slab.

When the paste is used in the mouth, however, it sets into a relatively hard, dense, coherent and somewhat flexible mass within a very short period, as for instance, within 5 minutes.

I am aware that numerous details of the process may be varied through a wide range without departing from the principles of this invention, and I, therefore, do not purpose limiting the patent granted hereon otherwise than necessitated by the prior art.

I claim as my invention:

1. A dental paste comprising an oily constituent and a solid constituent, said solid constituent comprising 50 to 95% zinc oxide, 5 to 50% rosin, and .1 to 10% magnesium chloride, the oily constituent being harmless and containing at least 20% of oil of cloves.

2. A dental paste comprising an oil constituent and a solid constituent, said solid constituent comprising 50 to 95 per cent of a metallic oxide 5 to 50 per cent of a resin, and 1/10 to 10 per cent of magnesium chloride to act as a hardening agent, the oil constituent being harmless and comprising at least 20 per cent oil of cloves.

3. A dental preparation comprising a solid constituent and an oily constituent for mixing together to form a paste, said solid constituent comprising by weight 50 to 95% zinc oxide, 5 to 50% rosin and about 1% of magnesium chloride, the oily constituent comprising a solution of rosin in a mixture of harmless oils including eugenol.

4. A dental preparation comprising a solid and an oily constituent which when mixed form a paste that will set in the mouth in about 5 minutes but which will retain its pasty consistency for a much longer period until used, the solid constituent comprising zinc oxide, rosin and about 1% of magnesium chloride and the oily constituent being harmless and containing eugenol and rosin dissolved therein.

5. A dental paste containing eugenol, zinc oxide, and rosin in setting proportions and magnesium chloride, in an amount not exceeding about 10% by weight of the mixture, to act as a hardening agent.

6. A dental paste containing a harmless essential oil, zinc oxide and a resin in setting proportions and magnesium chloride in an amount less than about 10% by weight of the mixture.

7. A dental preparation comprising an oil constituent and a solid constituent adapted to be mixed together to form a setting mixture, said solid constituent comprising about 80% zinc oxide, about 19% gum rosin and about 1% of magnesium chloride and said oil constituent being harmless and containing eugenol.

8. A dental preparation consisting of two separate non-setting portions adapted to be mixed together to form a setting mass which comprises a portion containing zinc oxide and magnesium chloride and a portion containing rosin, eugenol and a bland oil, the magnesium chloride being less than 10% of the final setting mass.

ERNEST BYRON KELLY.